United States Patent [11] 3,596,369

[72] Inventors Jack A. Dickerson
 Raleigh, N.C.;
 Gerald H. Ottaway, Pleasant Valley, N.Y.
[21] Appl. No. 887,023
[22] Filed Dec. 22, 1969
[45] Patented Aug. 3, 1971
[73] Assignee International Business Machines Corporation
 Armonk, N.Y.

[54] TRANSFORMERLESS POWER SUPPLY WITH LINE TO LOAD ISOLATION
 7 Claims, 7 Drawing Figs.
[52] U.S. Cl. .................................................. 321/43,
 320/1, 321/47
[51] Int. Cl. ............................................. H02m 7/12
[50] Field of Search ........................................... 321/4, 7,
 43, 47; 320/1

[56] References Cited
 UNITED STATES PATENTS
 3,247,444 4/1966 Clarke et al. ................. 321/4
 3,323,076 5/1967 Pelly .............................. 321/7 X
 3,377,541 4/1968 Farkas .......................... 321/43 X
 OTHER REFERENCES
 Applicant's Non-Pat. Citation " Filter Circuit," IBM TECHNICAL DISCLOSURE BULLETIN, T. J. Harrison & J. Jursik, Vol. 6, No. 8 Jan. 1964, page 25.

Primary Examiner—William M. Shoop, Jr.
Attorneys—Hanifin and Jancin and Delbert C. Thomas ABSTRACT: A transformerless power supply is disclosed in which a source capacitor has its charge maintained at a fraction of the AC supply voltage and a plurality of sink capacitors are sequentially switched between a charging connection to the source capacitor and a discharging connection to a load circuit. The load circuit is isolated from the line at all times to maintain safety protection. The use of a comparatively high switching speed will reduce the filter requirements in the load circuit and this together with the elimination of the transformer results in very substantial size and weight reductions from conventional supplies.
 Voltage regulation at the load is achieved by controlling the voltage to which the sink capacitors are charged from the source capacitor.

INVENTORS
JACK A. DICKERSON
GERALD H. OTTAWAY

BY *Delbert C. Thomas*
ATTORNEY

"SINK" CAPACITOR 13 TO LOAD 17 DISCHARGE

"SINK" CAPACITOR 13 TO SOURCE 11 CHARGE

TRANSFORMERLESS POWER SUPPLY WITH LINE TO LOAD ISOLATION

OBJECTS OF THE INVENTION

The invention set out herein relates to transformerless power supplies having isolation between the load circuit and the supply circuit, and more particularly to such power supplies for providing a low voltage, high current supply from a commercial powerline.

Transformerless power supplies are well known in versions such as are used in the older AC-DC radios. In that type of power supply, a single diode rectifies the power supply voltage for a half wave supply or a pair of oppositely poled diodes individually charge series-connected capacitors in a peak voltage doubling circuit. A full-wave bridge rectifier can also be used. In each of these supplies, the output voltage at no load is the line voltage peak or double that figure and the load voltage remains high even under normal loads, such power supplies do not meet safety requirements for isolation between the line circuit and the load circuits of commercial machines. In most such supplies, isolation is only that provided by the back resistance of a diode or through a large capacitor and a failure can permit dangerous voltages to be applied to the load side.

In commercial business machines such as data processing machines, power is required at large currents but low voltages. The isolation specifications for line to load insulation have usually been met by using transformers to convert the line voltage to a low output voltage before rectification and filtering. This type of power supply needs heavy transformer secondary and filter choke windings with massive iron cores.

The present invention provides a commercial-type low voltage power supply which does not use line transformers or large filter components and consequently can provide a size reduction of about 60 percent to 70 percent as compared with conventional supplies and shows a weight reduction to around 10 percent to 20 percent of the usual power supplies. The cost reduction is also substantial since solid-state components and switches can be used, and these will have substantial advantages over mechanical devices. In this new power supply, the AC supply is rectified either full wave or half wave starting at a phase angle near the end of the decreasing voltage part of the cycle to charge a source capacitor to a voltage somewhat higher than the desired load voltage. A plurality of smaller sink capacitors are then sequentially connected to the source to be charged to the load voltage and are then sequentially switched over to the load circuit to power the load. A high switching speed generates only a small high frequency ripple in the load circuit which can be easily filtered by use of small components. Any powerline frequencies can be eliminated from the load circuit by regulating the voltage to which the sink capacitors are charged from the source capacitor.

It is a primary object of this invention to reduce the size and weight of low voltage, high current power supplies as used in commercial applications by eliminating the conventional transformer and substantially reducing the filter components normally required in powerline conversion systems.

It is another object to provide such a power supply wherein the load circuit is isolated from the line circuit by a substantial impedance corresponding to that between the windings of a transformer.

Still another object is to provide a transformerless power supply wherein the output current is supplied with a high ripple rate enabling effective filtering with the use of smaller filter components.

A further object is to reduce the size and weight of a power supply by the use of a number of capacitors which are sequentially switched between a DC voltage source and a load circuit to provide both source to load isolation and a high frequency ripple voltage in the load circuit.

A still further object is to provide voltage-regulating systems for such a power supply to maintain a load independent output voltage, eliminate any load circuit ripple at powerline frequencies and to improve overall circuit conversion efficiency.

The foregoing and other objects, features and advantages of the invention will be apparent from the following more particular description of preferred embodiments of the invention, as illustrated in the accompanying drawings.

DRAWINGS

DETAILED DESCRIPTION

Figure 1:
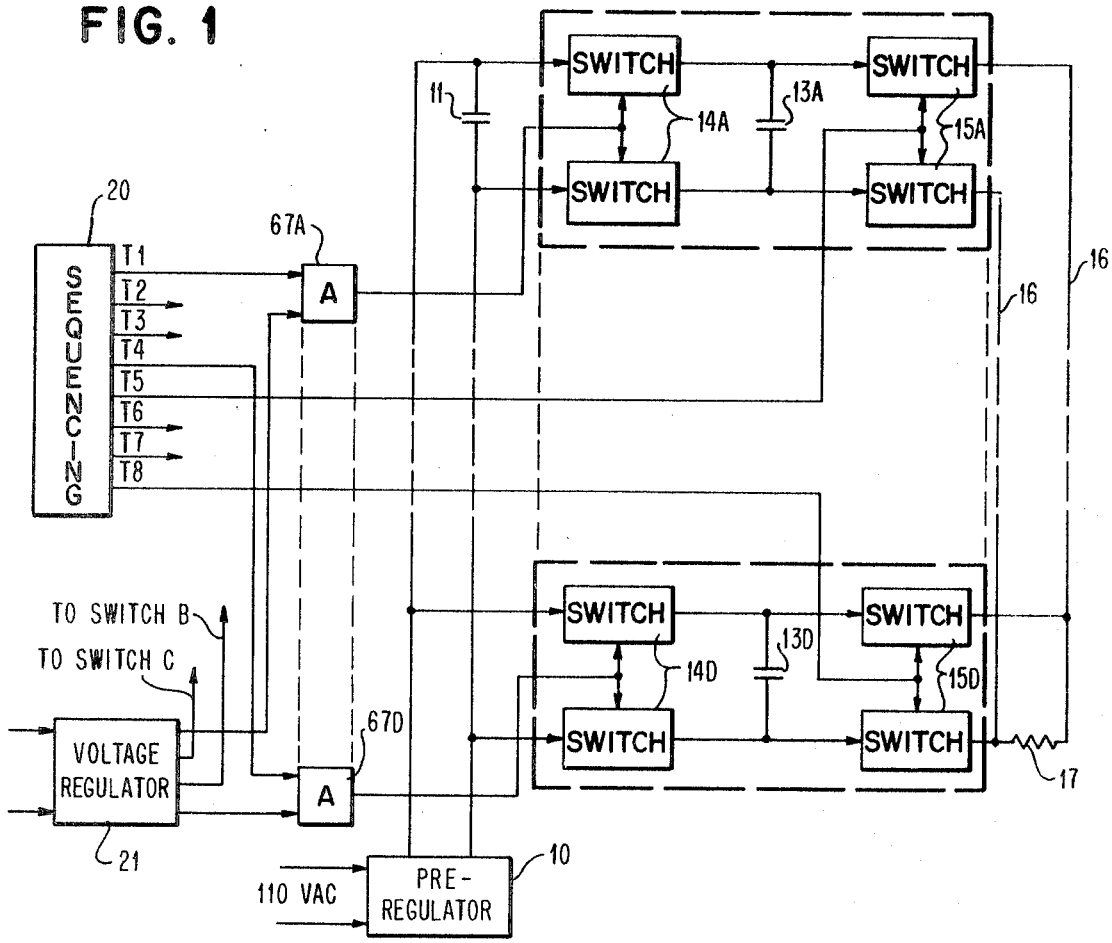
FIG. 1 is a diagrammatic showing of the improved power supply including one type of voltage-regulating connection.

The preferred embodiment of our invention, as diagrammed in FIG. 1, provides a preregulator 10 which rectifies the usual 110 v. AC line voltage to a lower DC (pulsating) level. Preregulator 10 will be later set out in more detail, but broadly serves to select the point on the decreasing part of the line voltage at which the line will be connected to charge a source capacitor 11. The maximum voltage to which capacitor 11 will be charged on any powerline cycle will be controlled by preregulator 10 determining the time and duration of connection of capacitor 11 to the powerline. A plurality of sink capacitors 13A, 13B, etc. four such capacitors being indicated in FIG. 1 for purposes of illustration, are connectable to source capacitor 11 by a double pole switching circuit 14A, 14B, etc. Capacitors 13 are also connectable by double pole switches 15A, 15B, etc. to a load circuit 16 to supply power to a load 17. The switches 14 and 15 are controlled in their operation by a sequencing switch 20 which will connect one sink capacitor 13 to source capacitor 11 for charging and another sink capacitor 13 to loadline 16 are discharge through load 17. Switches 14 are also controlled by a voltage regulator 21 which limits the voltage to which capacitors 13 are charged from source capacitor 11.

Figure 2:
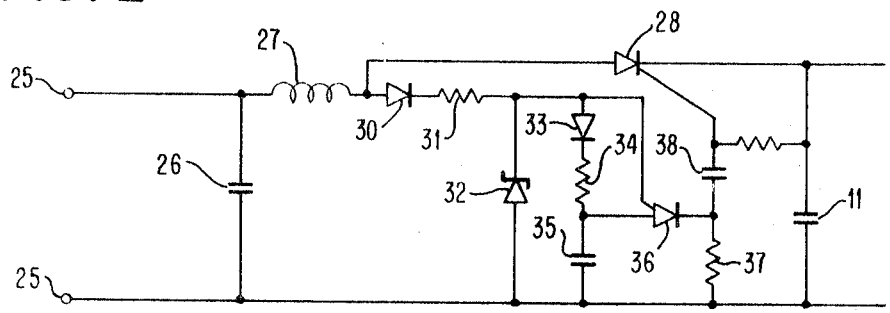
FIG. 2 shows one type of preregulator for the power supply.

More specifically, one embodiment of preregulator 10 is shown in FIG. 2. An AC power source or preferably a full-wave-rectified AC source is connected to terminals 25. A capacitor 26 across the terminals and a small inductance 27 in series with the upper terminal are a line filter to minimize transmission of switching transients from the preregulator to the powerline. The other end of inductor 27 is connected to the anode of a silicon-controlled rectifier (SCR) 28 which has its cathode connected to one side of source capacitor 11. The lower terminal 25 is connected directly to the other lead of capacitor 13. The gate voltage on SCR 28 is controlled to set the firing point of SCR 28 with reference to the AC cycle phase angle and to thereby determine the maximum voltage to which capacitor 11 will be charged. The gate control of SCR 28 is through a rectifier 30 having its anode connected to the right end of inductor 27 and its cathode connected through a resistor 31 to the cathode of a zener diode 32 having its anode connected to the lower terminal 25. The cathode voltage on zener diode 32 will thus follow the input voltage until the zener diode breaks down, will be substantially constant until the zener diode breaks down, will be substantially constant until the input voltage decreases to the zener rating and will then again follow the input. A diode 33, resistor 34 and capacitor 35 in series across zener diode 32 provide a cyclically delayed voltage at the junction of resistor 34 and capacitor 35. This delayed voltage is applied to the anode of a programmable unijunction transistor 36 whose gate is connected to the cathode of zener diode 32. Transistor 36 is similar to an SCR but has the characteristic that initial conduction will be prevented until the anode voltage is about one-half volt higher than the gate voltage. One unijunction transistor of this type is produced by General Electric Company and is marketed as Type D 13 T 1.

In the circuit shown, it will be evident that with a rising input voltage, the anode voltage will lag behind that of the gate and this relation will be maintained until near the end of the cycle of the voltage on terminals 25, the input voltage decreases below the breakdown voltage of zener diode 32. At this point the voltage of the zener cathode and that on the gate of transistor 36 will start to decrease and will shortly go below that on the anode which will be maintained by capacitor 35. When the gate to anode voltage reaches the firing potential, unijunction transistor 36 will conduct and discharge capacitor 35 through resistor 37 connected to its cathode. This discharge produces a sharp pulse on the cathode circuit and the pulse is passed through a capacitor 38 to the gate circuit of SCR 28 to fire SCR 28 and recharge capacitor 11. This sequence of operations will occur on each cycle of the input voltage and will serve to maintain capacitor 11 charged to a voltage determined by the rating of zener diode 32.

Figure 3:
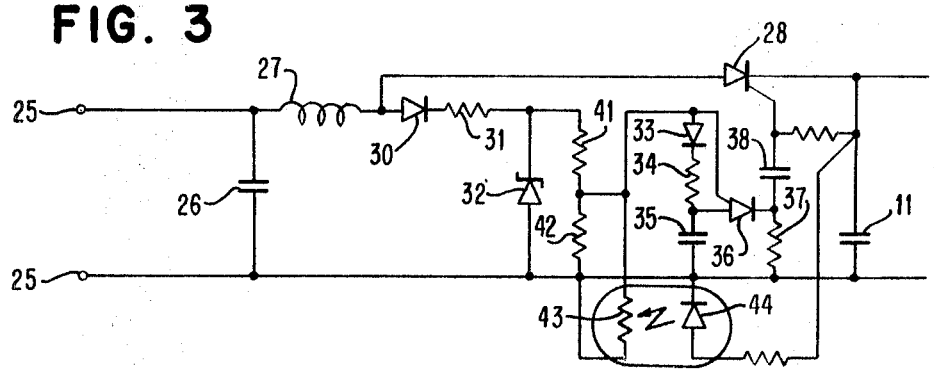
FIG. 3 shows a modification of the preregulator of FIG. 2 to provide for improved regulation of the source voltage.

Since the minimum voltage to which source capacitor 11 discharges between the cycles of the line voltage depends upon the load power being drawn, an additional circuit shown in FIG. 3 may be installed to improve preregulation. This preregulation will maintain approximately uniform the voltage to which the source capacitor 11 is charged under all load current conditions and will substantially improve circuit efficiency. In FIG. 3, the circuit from input terminals 25 to zener diode 32 and the gating circuit for SCR 28 from diode 33 are similar to those of FIG. 2 but a pair of resistors 41 and 42 in series are placed across zener diode 32 with the anode of diode 33 connected to their junction. The lower resistor 42 is shunted by a photosensitive resistor 43. A light-emitting diode 44 is connected across source capacitor 11 and is optically coupled to photoresistor 43. The optically coupled photoresistor combination is commercially available from Monsanto Company as their item MCR 1.

In operation, resistors 41, 42 and 43 act as a voltage divider to apply a part of the zener diode voltage to the trigger circuit for SCR 28. The portion of the voltage applied will depend upon the resistance of resistor 43 and this in turn will be determined by the voltage on source capacitor 11 rises, diode 44 generates more light to decrease the resistance of resistor 43 and this reduces the voltage fed to the trigger circuit for SCR 28. This reduction in trigger circuit will tend to retard the firing point of SCR 28 to reduce the voltage switched to SCR 28. When the output voltage decreases, the opposite action will be initiated. This type of feedback control can be so set that the average voltage of capacitor 11 is substantially independent of the load current drawn from the power supply.

The switches 13 and 14 of FIG. 1 may be any conventional type of current switching circuit such as a power transistor having its base controlled for the switching function. Generally, however, such switches do not meet commercial standards for isolation since under some failure conditions, the line and load circuitry could be connected. It is, therefore, preferred to use an isolated switch in which the control circuit is separated from the switched circuit. Light-actuated switches in which the switch control is by emitted light are known but are not sufficiently developed to switch currents of the magnitude and voltage needed in commercial applications.

Figure 7:
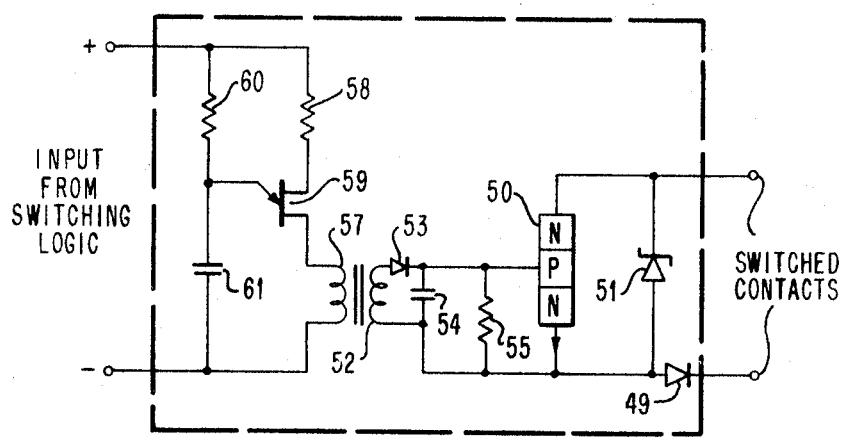
FIG. 7 is an example of one type of isolated switch which can be used in the power supply.

The isolated switch shown in FIG. 7 is one type which has been found satisfactory in the present power supply. This switch has a power transistor 50 and a diode 49 in the switched circuit for the main switch with a zener diode 51 across transistor 50 to bypass any damaging voltage surges and a base control circuit to control current flow. The base control circuit comprises the secondary 52 of a small transformer with a diode 53 and capacitor 54 across the secondary 52. The base of transistor 50 is connected to the junction of diode 53 and capacitor 54 and has a resistor 55 connected between it and the transistors emitter as a capacitor discharge circuit. The emitter of transistor 50 is connected to the other lead of capacitor 54. In this circuit an AC voltage in secondary 52 will be rectified and the resulting DC voltage applied to the base of transistor 50 to establish current flow through transistor 50. When the AC voltage is removed, capacitor 54 discharges through resistor 55 and current flow is terminated. The AC voltage in secondary 52 is generated by an intermittent current through transformer primary 57. This intermittent current is derived from a switching voltage by a conventional unijunction circuit. The unijunction circuit comprises a resistor 58 from a positive logic voltage to the anode of the unijunction 59 with the unijunction cathode connected through primary 57 to the negative logic voltage. A resistor 60 and capacitor 61 are connected in series from the positive to the negative logic voltages and their junction is connected to the gate of unijunction 59. With such a connection, the unijunction 59 will start to conduct when the gate voltage rises to a given point, will conduct while the gate voltage is decreasing due to discharge of capacitor 61, and will stop conducting when the gate voltage reaches a lower limit. The capacitor 61 will then start to recharge until its voltage is high enough to start the unijunction conducting to repeat the cycle.

The switches 14 and 15 are controlled to sequentially connect the sink capacitors 13 to source capacitor 11 and to alternately connect them to the load circuit 16 so that one sink capacitor 13 is connected to the load at all times. The switching sequence is controlled by the sequencing switch 20 of FIG. 1 which cycles to close a switch 14 to charge a capacitor 13 from the source capacitor 11 during a first interval, opens switch 14 during a second interval, closes switch 15 to discharge the capacitor 13 through the load 17 during a third interval and opens the switch 15 during a fourth interval. The cycles for the sink capacitors 13A, 13B, 13C, etc. are staggered so that only one capacitor is connected to the load at a time.

Figure 4:
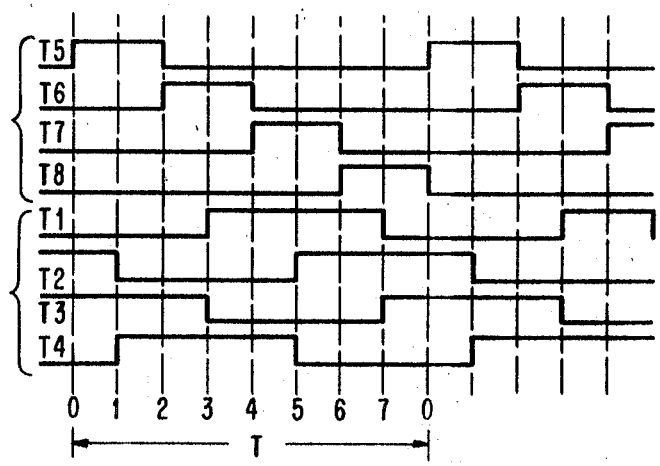
FIG. 4 is a timing chart showing the time relationships between the outputs of the sequencing switches.

It has been found that the smoothest and easiest filtered-output voltage is obtained with the highest switching cycle speed. At higher speeds, however, the large components needed to carry the heavy current do not switch cleanly and a compromise speed must be selected. It has been found that a switching speed of 1 to 5,000 cycles per second is easily obtainable and gives a satisfactory power output. FIG. 4 indicates the outputs of the switch 20, and it may be seen that a cycle is divided into eight parts (twice the number of sink capacitors). Each capacitor 13 has its switch 15 closed during two periods, both switches 14 and 15 for a capacitor are open for a third, switch 14 is then closed for four periods and then both switches are open for the last period. With a two period offset between the cycles for the sink capacitors 13A, 13B, etc. one capacitor will always be discharging into load circuit 16. The four-period length for closure of switch 14 may not always be necessary but has been included in some embodiments to insure adequate charging of a sink capacitor 13. The sequencing switch 20 may be a conventional oscillator-controlled ring circuit of the type well known for timing purposes in data processing machines.

Figure 5:
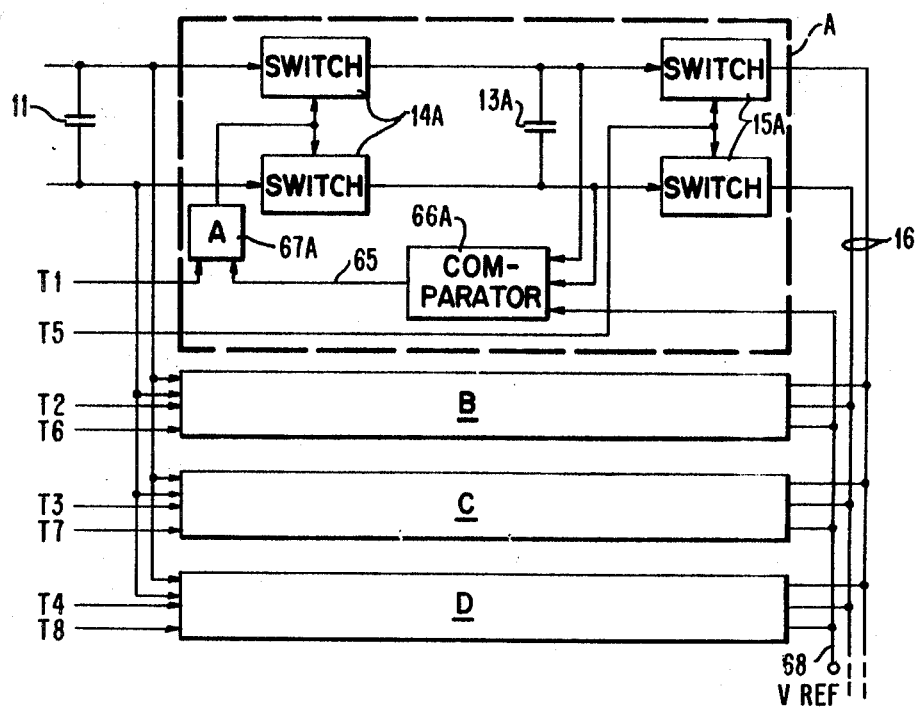
FIG. 5 is one type of output voltage regulator in which each sink capacitor has its charge independently monitored.

Several systems for regulation of the output voltage on circuit 16 are available and the most satisfactory ones control the charged voltage on capacitors 13. In FIG. 5, the voltage to which a sink capacitor 13 is charged is individually controlled. As shown, switch 15A is controlled directly by the T1 output from sequencing switch 20 but switch 14A is controlled through an AND circuit 67 from both the T5 output of switch 20 and an output 65 of a voltage comparator 66 which may be of an isolated input to output type using balanced oscillators driven by the load voltage and a reference voltage respectively. The voltage on capacitor 13 is continuously compared with a reference voltage on a lead 68 and when the capacitor voltage is lower than the reference voltage as it presumably would be after it has discharged to a load, the output of comparator 66 on lead 65 is at a high level. Now when sequencing signal T5 is present, AND 67 has a logic output signal to close switch 14 and charge capacitor 13. The voltage on capacitor 13 will continue to be monitored and when it reaches that of the voltage reference, comparator 66 will drop the voltage of its output 65 to open switch 14 and stop charging of capacitor 13. A similar circuit is provided for each sink capacitor 13 to control its charging voltage.

This regulation circuit may be made less complicated by using a single comparator 66 to control all switches 14. In this type of circuit, the output of the one comparator 66 goes to all ANDs 67 and its inputs are gated to the respective capacitors 13 in turn through gates controlled by their timing signal for their switches 14. With this regulating circuit, the charging periods should not overlap and a four-part timing period is sufficient.

Figure 6:
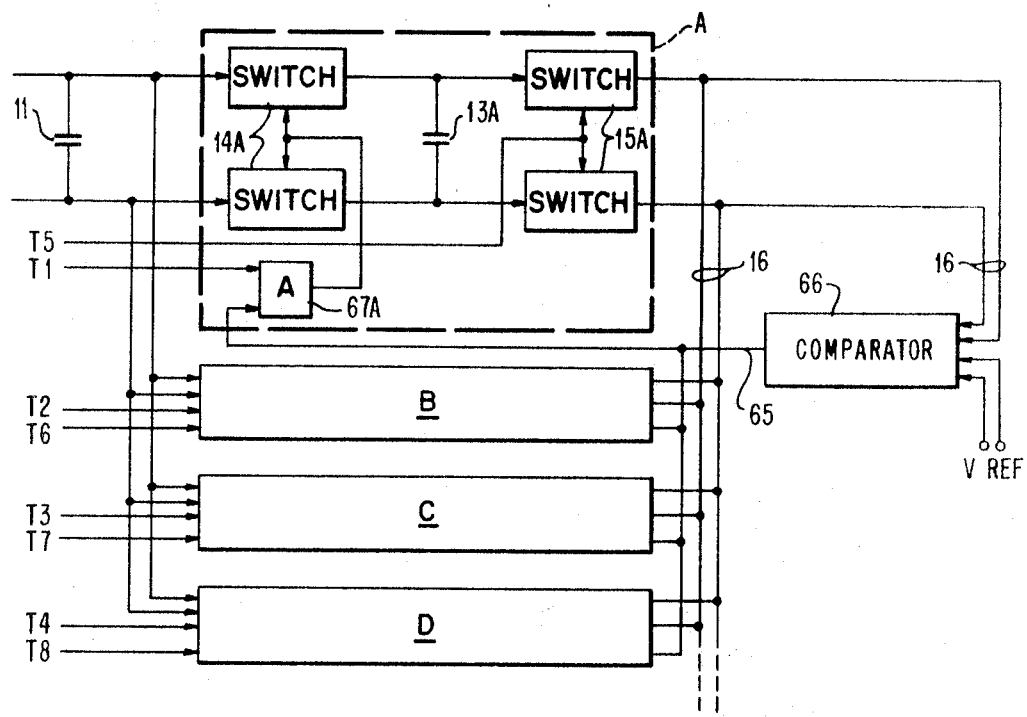
FIG. 6 is another type of output voltage regulator in which the output voltage is monitored to control connection of the sink capacitors to the source.

Another type of voltage regulator as shown in FIG. 6 can be used if the sink capacitors 13 are sufficiently large to change in voltage only slightly during one timing cycle and if their charging rate can be so restricted as to supply in each cycle only a little more charge than the maximum charge delivered by a capacitor 13 to the load circuit 16. In this circuit, isolated comparator 66 has its input connected to the load circuit 16 and its output 65 controls all of the AND circuits 67. This is effectively an ON-OFF type of regulator in which the sink capacitors 13 are recharged only when the output voltage is below the reference voltage. Since there is a delay of at least a part of a switching cycle between detection of an output voltage variation and the start of the correction for the variation, this type of ON-OFF regulation has an inherent ripple whose frequency is dependent upon comparator response time. It is, however, comparatively inexpensive and satisfactory where some power supply ripple is permissible.

This type of ON-OFF voltage regulation has a further advantage in that when the load 17 is at a substantial distance, it can compensate for voltage drop in the power leads 16. There is little current used by the comparator 66 and if its input leads for the voltage to be regulated are connected to lines 16 at the load end, the load voltage will be compared with the reference voltage and the output voltage at switches 15 will vary in accordance with the load current.

While the invention has been particularly shown and described with reference to preferred embodiments thereof, it will be understood by those skilled in the art that the foregoing and other changes in form and details may be made therein without departing from the spirit and scope of the invention.

What we claim is:

1. A direct current power supply comprising a source capacitor, a phase-controlled rectifier for charging said source capacitor to a predetermined voltage from an AC power source having an RMS voltage substantially higher than said predetermined voltage, a plurality of sink capacitors, a first switch means for each sink capacitor to connect said sink capacitor across said source capacitor, a second switch means for each sink capacitor to connect said sink capacitor to a load circuit, and a sequencing switch to alternately operate said first and second switch means to enable each sink capacitor to transfer a charge from said source capacitor to said load circuit, said sequencing switch controlling said first switch means for said plurality of switch capacitors to operate in a fixed sequence and controlling said second switch means to operate in the same sequence with a time displacement.

2. A power supply as set out in claim 1 including a load voltage-regulating control, said control comprising for each sink capacitor, a comparing circuit to provide a signal voltage when the voltage of its sink capacitor is greater than a reference voltage and a switch control circuit to prevent operation of said first switch means when said signal voltage is present.

3. The power supply set out in claim 1 including an output voltage-regulating circuit responsive to the output voltage of said power supply to prevent closure of any of said first switch means so long as said output voltage is greater than a predetermined voltage.

4. The power supply set forth in claim 1 including an output voltage-regulating circuit comprising a voltage comparator to provide a signal voltage when the voltage applied to its input circuit is above a reference level, a control means for said first switch means to open any of said first switch means when said signal voltage is present, and a circuit connecting one of said sink capacitors at a time to the input circuit of said comparator.

5. A direct current power supply comprising a source capacitor, an AC power input, a controlled-phase rectifier between said power input and said source capacitor, a phase control network for said rectifier to charge said source capacitor to a voltage substantially lower than the RMS voltage of said AC power input, a plurality of first switches connected to said source capacitor, a sequencing switch to sequentially close and sequentially open said plurality of first switches, a sink capacitor for each first switch, each said sink capacitor being connected for charging to said source capacitor by its said first switch, a load circuit, a plurality of second switches, each to connect one of said sink capacitors to supply power to said load circuit, connections from said second switches to said sequencing switch to open and close said second switches in the same sequence as said first switches but with a predetermined time delay and output voltage-regulating means to additionally control the closing and opening of said first switches.

6. A power supply as set out in claim 5 wherein said voltage-regulating means comprises a voltage comparator for each sink capacitor and a first switch control means to prevent connection of its associated sink capacitor to said source capacitor so long as the voltage of said sink capacitor exceeds a predetermined level.

7. A low voltage power supply comprising a source capacitor, an AC power input, a phase-controlled rectifier to connect said AC input to said source capacitor during the decreasing voltage part of the cycle of said AC power to charge said source capacitor to a relatively small part of the RMS voltage of said power input, a plurality of sink capacitors, first sequentially operated switches to connect said sink capacitors to said source capacitor seriatim, a second set of switches operated in the same sequence as said sequentially operated switches but having a predetermined time delay therefrom to connect said sink switches to an output load circuit, and output voltage control means to control opening of said first sequentially operated switches.